United States Patent [19]

Wallace et al.

[11] Patent Number: 5,041,298
[45] Date of Patent: Aug. 20, 1991

[54] METHOD AND APPARATUS FOR SUBJECTING PRODUCE TO A CONTROLLED ATMOSPHERE

[75] Inventors: Graeme B. Wallace, Bayswater; Glenn R. Adams, Seaford, both of Australia

[73] Assignee: Co-Ordinated Thermal Systems Pty. Ltd., Victoria, Australia

[21] Appl. No.: 551,773

[22] Filed: Jul. 12, 1990

[30] Foreign Application Priority Data

Jul. 19, 1989 [AU] Australia .............................. PJ5353

[51] Int. Cl.⁵ .......................... A23B 7/00; A23L 1/00
[52] U.S. Cl. ....................................... 426/418; 98/36; 99/474; 426/419
[58] Field of Search ................. 426/418, 419; 99/467, 99/474; 62/414, 419, 329; 98/6, 36

[56] References Cited

U.S. PATENT DOCUMENTS 2,079,304  5/1937  Polderman ........................ 426/419
4,676,152  6/1987  Tsuji et al. .......................... 99/474
4,824,685  4/1989  Bianco ............................... 426/418

Primary Examiner—George Yeung
Attorney, Agent, or Firm—Foley & Lardner

[57] ABSTRACT

A chamber and a method for subjecting produce such as bananas to a controlled atmosphere is disclosed. The chamber has an end wall and produce is loaded into the chamber in two rows. A lower tier stack of produce rests on the floor of the chamber while an upper tier stack is supported above the lower tier stack by a frame structure. An atmosphere circulating space is provided at each side of the chamber between the stacks, and the spacing of the rows provides an upper intersitial volume and a lower intersitial volume. Sealing device seals the upper and lower intersitial volumes from each other while further sealing device in the form of two blinds seals the upper and lower intersitial volumes from the atmosphereic circulating space. A controlled atmosphere is caused to flow across the produce from the atmosphere circulating space into the intersitial volumes or in the reverse direction.

10 Claims, 5 Drawing Sheets

METHOD AND APPARATUS FOR SUBJECTING PRODUCE TO A CONTROLLED ATMOSPHERE

FIELD OF THE INVENTION

The present invention relates to a method and apparatus for subjecting produce to a controlled atmosphere and relates particularly but not exclusively to such in connection with the ripening of bananas.

DESCRIPTION OF PRIOR ART

Hitherto, several apparatus have been provided in which crates of bananas can been placed so that the bananas in the crates can be subjected to a controlled atmosphere to assist in non-ripening of the bananas until required and when ripening is required providing a required atmosphere to the bananas to effect ripening.

One known apparatus is shown in U.S. Pat. No. 4,824,685 the disclosure of which is hereby incorporated by reference.

The apparatus disclosed in the above U.S. patent specification basically provides a chamber into which bananas can be stacked in crates. The crates are, in turn, stacked on pallets which can be easily loaded into the chamber by a forklift truck or the like. A controlling apparatus is provided so that a required atmosphere can be provided within the chamber. The crates within which the bananas are stacked are usually of cardboard with holes in the sides thereof so that the gas can freely circulate across the crates through the holes and contact the surface of the bananas.

The lowermost crates have a limited ability to support each successive tier of crates without compressing and the bananas in the lowermost tier being squashed by the weight of the bananas in upper tiers. In practice it has been found that the tiers may be in the order of six to ten crates high without fear of squashing the produce in the lower crates.

To provide a chamber of dimensions which will only allow about six to ten crates high of bananas to be stacked is relatively uneconomic. Accordingly, the above patent specification discloses the use of a frame structure within the chamber which can support a pallet having an upper tier stack thereon. In this way the frame will carry the weight of the upper tier stack so that it will not be resting on the lower tier stack. Two rows of both upper and lower tier stacks are provided in the chamber. Each row is spaced apart so an intersitial volume is provided between the two rows. A seal in the form of a blind is applied over the top of the upper tier and down the end face of both the upper tier and the lower tier. The arrangement is such that the atmosphere within the chamber can be caused to circulate around the sides of the chamber and pass through the holes in the crates and across the bananas and then pass through holes in the other side of the crates into the intersitial volume where it can be removed from the chamber by suitable fan means and caused to be reintroduced into the chamber for further circulation if required.

Several problems exist with the apparatus disclosed in the arforementioned U.S. patent specification. It is a requirement in the apparatus disclosed in the aforementioned U.S. patent specification that the vertical space between the lowermost tier stack and the uppermost tier stack must be sealed otherwise the gas would tend to pass between the vertical space above the lowermost tier stack and the uppermost tier stack rather than through the crates and across the bananas. Complicated seal means are required to seal the above space. The seal means are relatively fixed such that the lowermost tier stack must be stacked to a predetermined height of crates at all times. This presents considerable difficulty in an in use environment of the apparatus as it is often required to remove certain crates whilst leaving certain other crates within the chamber. The construction provided by the seals necessitates that the lower tier stack is always full to the required tier height. Thus, whilst it is possible to remove crates from the upper tier stack, the lower tier stack must always remain full.

OBJECT AND STATEMENT OF THE INVENTION

We have realized that an improved construction can be provided which will permit crates in the lower tier stack to be removed if required. This also permits a decision to be made as to how many crates will be in the lower tier stack and the upper tier stack at any given time. A user of the apparatus is not constrained to provide the lower tier stack to the required crate height.

Therefore, in accordance with a first broad aspect of the present invention there may be provided a chamber in which said produce is to be subjected to said controlled atmosphere, frame means within said chamber for supporting an upper tier stack of palletized produce in two rows above a lower tier stack of palletilzed produced in two rows, said frame means locating each palletized upper and lower tier stacks inwardly of the side walls of the chamber to define an atmosphere circulating space therebetween and with a respective upper intersitial volume between the upper rows, and a lower intersitial volume between the lower rows, sealing means sealing the upper and lower intersitial volumes from each other at the lowermost level of the upper tier stack, further sealing means for sealing the upper intersitial volume and the lower intersitial volume from said atmosphere circulating space, and atmosphere control means to exhaust controlled atmosphere from each of the upper and lower intersitial volumes, and to introduce controlled atmosphere to said atmosphere circulation space, to thereby force the introduced controlled atmosphere to flow through said palletized produce.

According to a further broad aspect of the present invention there may be provided a method of subjecting produce to controlled atmosphere comprising the steps of:

(a) inserting palletized produced into a chamber;

(b) arranging and supporting the palletized produce in two rows of a lower tier stack and an upper tier stack, said two rows being spaced from one another to define an upper intersitial volume therebetween and a lower intersitial volume therebetween, and an atmosphere circulating space between the side walls of the chamber, (c) providing a seal between the upper intersitial volume and the lower intersitial volume at the bottom of the upper tier stack, (d) sealing the upper intersitial volume and the lower intersitial volume from said atmosphere circulating space, (e) exhausting controlled atmosphere from said upper and lower intersitial volumes and introducing controlled atmosphere into said fluid circulation space to thereby force controlled atmosphere to flow through said palletized produce.

Most preferably the controlled atmosphere is exhausted from the chamber by exhausting directly from said upper and lower intersitial volumes. The controlled atmosphere can be introduced into the chamber by being introduced in the atmosphere circulating space between the side walls of the chamber and the produce. In this way, the controlled atmosphere will pass directly from the atmosphere circulating space through the goods and then into the upper and lower intersitial volumes. Typically, the volume of the upper and lower intersitial volumes is less than the volume of the atmosphere circulating space and hence it will be more energy efficient to withdraw controlled atmosphere from the intersitial volume than to withdraw it from the atmosphere circulating space. However, the reverse direction of flow is embraced within the broad concept of the invention.

The further sealing means which seals the upper intersitial volume and the lower intersitial volumes from the atmosphere circulating space comprises a respective blind means for sealing the upper intersitial volume and a further blind means for sealing the lower intersitial volume. The blind means can lie over the top of the upper tier stack and the lower tier stack respectively.

BRIEF DESCRIPTION OF DRAWINGS

In order that the invention can be more clearly ascertained an example of a preferred embodiment will now be described with reference to the accompanying drawings where.

DESCRIPTION OF PREFERRED EMBODIMENT

Figure 1:
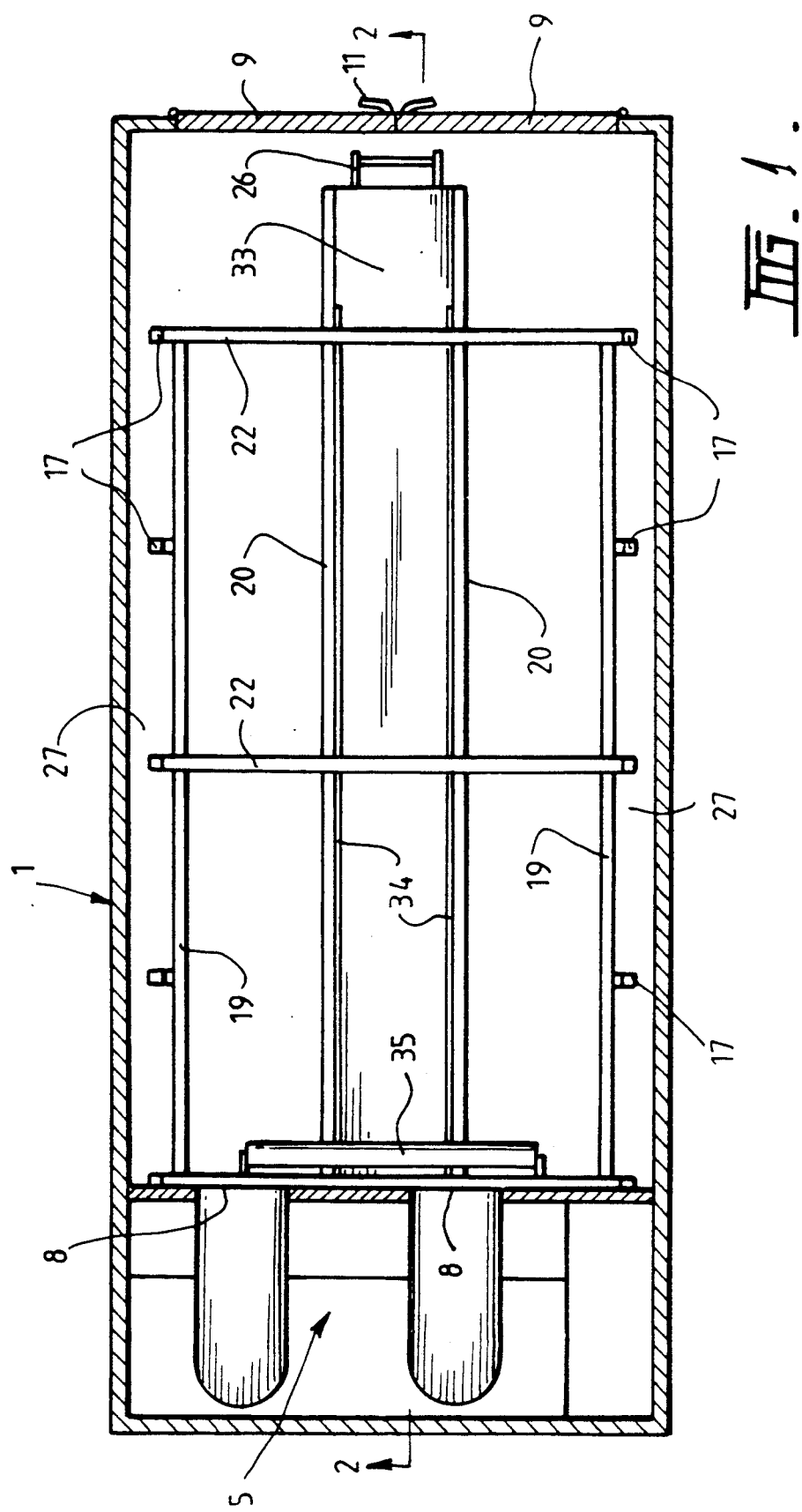
FIG. 1 is a plan view of a preferred banana ripening apparatus with a top of the apparatus not shown.
Figure 2:
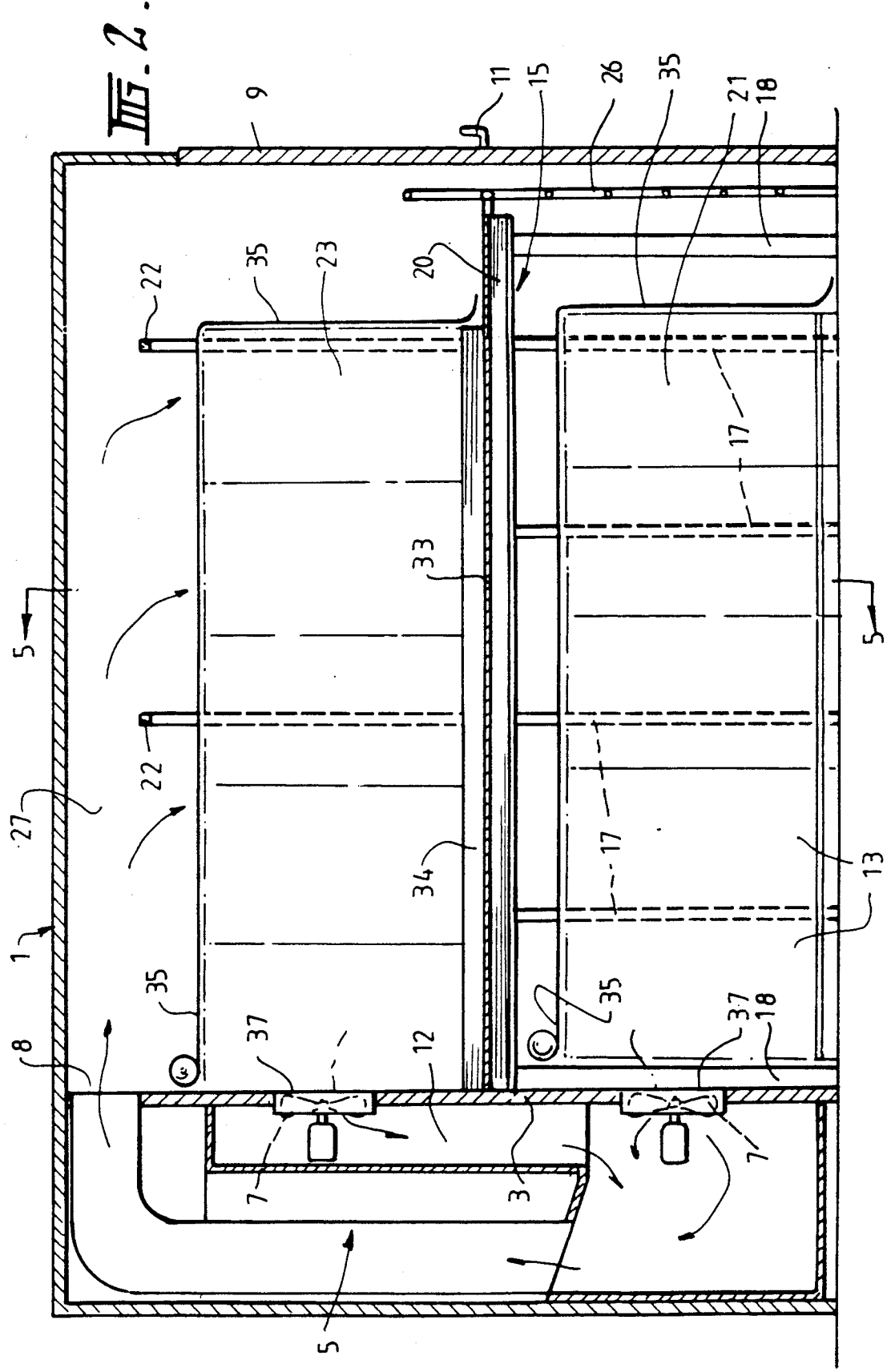
FIG. 2 is a cross sectional side view of the apparatus shown in FIG. 1 taken along section line 2—2 of FIG. 1.

Referring now to all the drawings it can be seen that there is provided a chamber 1 which has false wall 3 at one end. Mounted behind the false wall 3 is a controlled atmosphere producing apparatus 5 and atmosphere circulating fans 7 which can be termed atmosphere control means. The fans 7 may be in the positions shown or in other positions such as within the atmosphere producing apparatus 5. The controlled atmosphere producing apparatus 5 may be of known type which introduces a required gas so that a controlled atmosphere can be provided within the chamber 1. It may also comprise humidification apparatus and cooling apparatus of known type for this purpose. The chamber 1 may have doors 9 which are closeable by handle means 11. The doors 9 are at the end of the chamber 1 remote from the end wall 3. The doors 9 can be opened to permit loading and unloading of palletized tier stacks of produce 13 into the chamber 1. Typically, this can be by means of a fork-lift truck or like loading apparatus. The produce, typically bananas, is packed in crates which are arranged on each of the pallets to abut with one another when all the palletized stacks are within the chamber 1. FIGS. 1 and 2 clearly show that the first palletized tier stacks into the chamber 1 are moved as far as possible hard up against the end wall 3 to effect a seal therewith. Foam cushions (not shown) can be placed between the end wall 3 and the crates to effect a seal with the end wall 3 and the crates. This will be explained further in due course.

Figure 3:
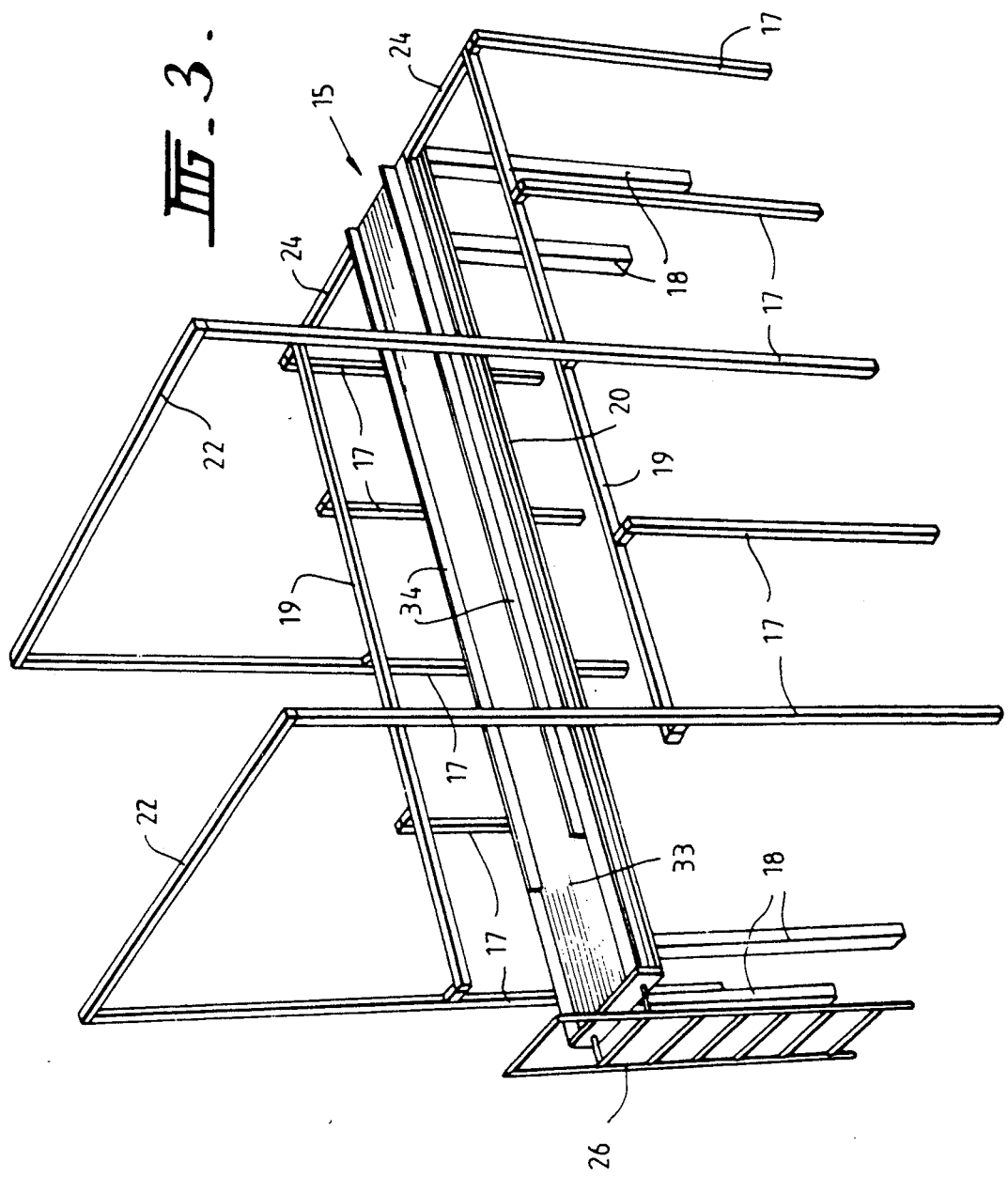
FIG. 3 is a perspective view of frame means used within the apparatus.
Figure 5:
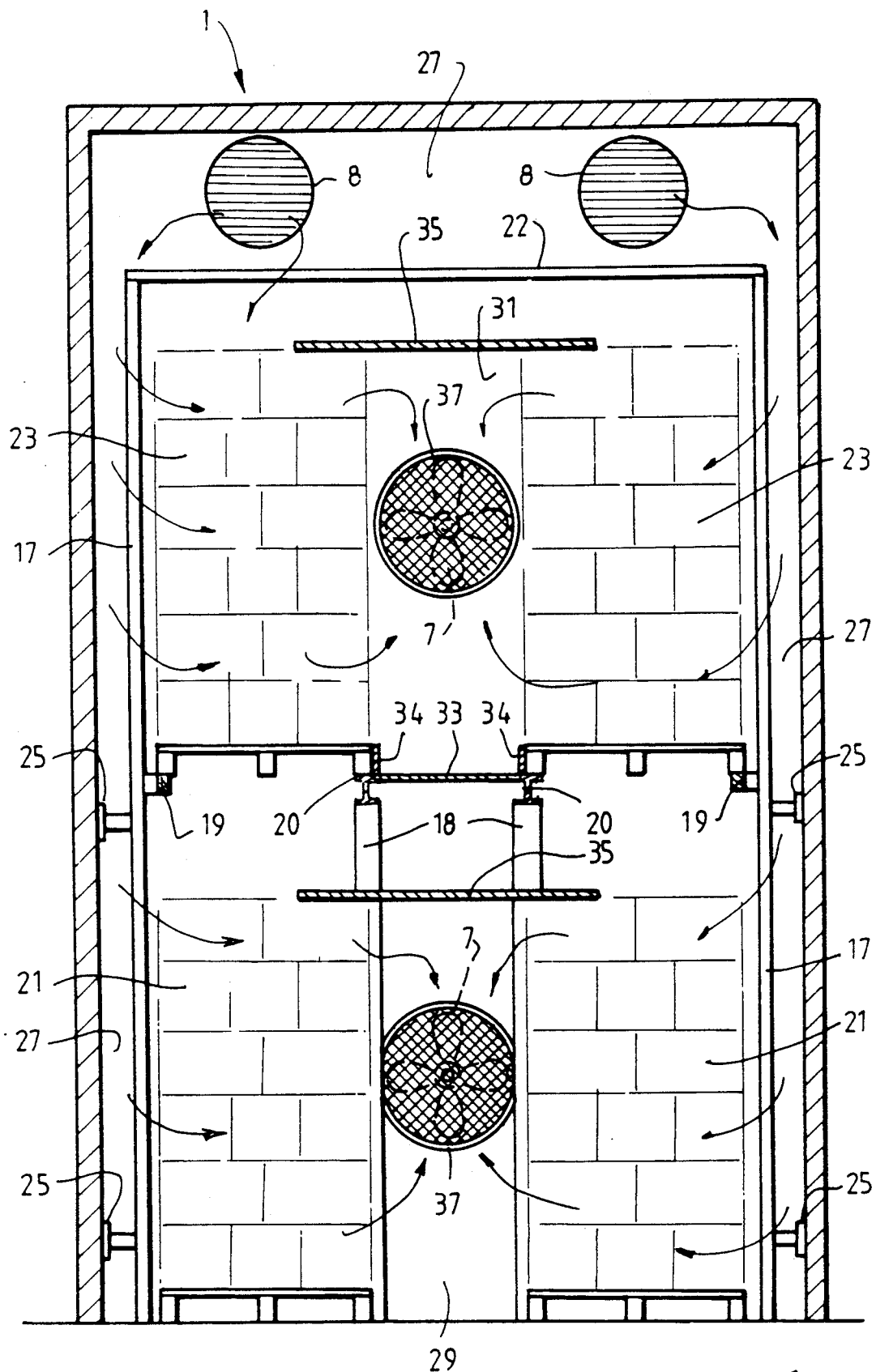
FIG. 5 is a transverse cross-sectional view taken along section line 5—5 of FIG. 2.

Frame means 15 (shown in detail in FIG. 3) is provided within the chamber 1. The frame means 15 comprises a series of upright legs 17 and upper horizontally extending outer supporting rails 19. Two horizontally extending R.S.J.'s provide inner supporting rails 20 which are, in turn, supported by R.S.J. upright legs 18. Bars 24 at the rear of the frame means 15 locate the inner supporting rails 20 at a required position relative to the outer supporting rails 19. The forward end of the rails 20 can be located against stops (not shown) at the front of the chamber 1 on the floor to correctly position the inner rails 20 relative to the outer rails 19. The frame means 15 permits the palletized produce to be introduced into the chamber in a lower tier stack 21, and an upper tier stack 23 (see FIG. 2). It also permits the upper tier stack 23 to be in two rows mounted above the lower tier stack 21 which is also in two rows. It can be seen from FIG. 5 that the upper tier stack 23 rests in each row on pairs of opposed horizontal supporting rails 19 and 20. The frame measn 15 may be supported relative to the side walls of the chamber 1 by supporting brackets 25. Spacing bars 22 are provided between extensions of opposed parts of some of the legs 17 across the chamber 1 so as to support each of the legs 17 and the rails 19 in the required position. The frame means also enables the palletized tier stacks to be in two stacks i.e. an upper stack 23, and a lower stack 21. The arrangement is such that there is provided an atmosphere circulating space 27 between the walls of the chamber 1 and the outermost edges of the palletized produce. This is clearly shown in FIG. 5.

A lower intersitial volume 29 is provided between the two rows in the lower tier stack 21, and an upper intersitial volume 31 is provided between the upper tier stack 23. This has only been shown in FIG. 5.

Figure 4:
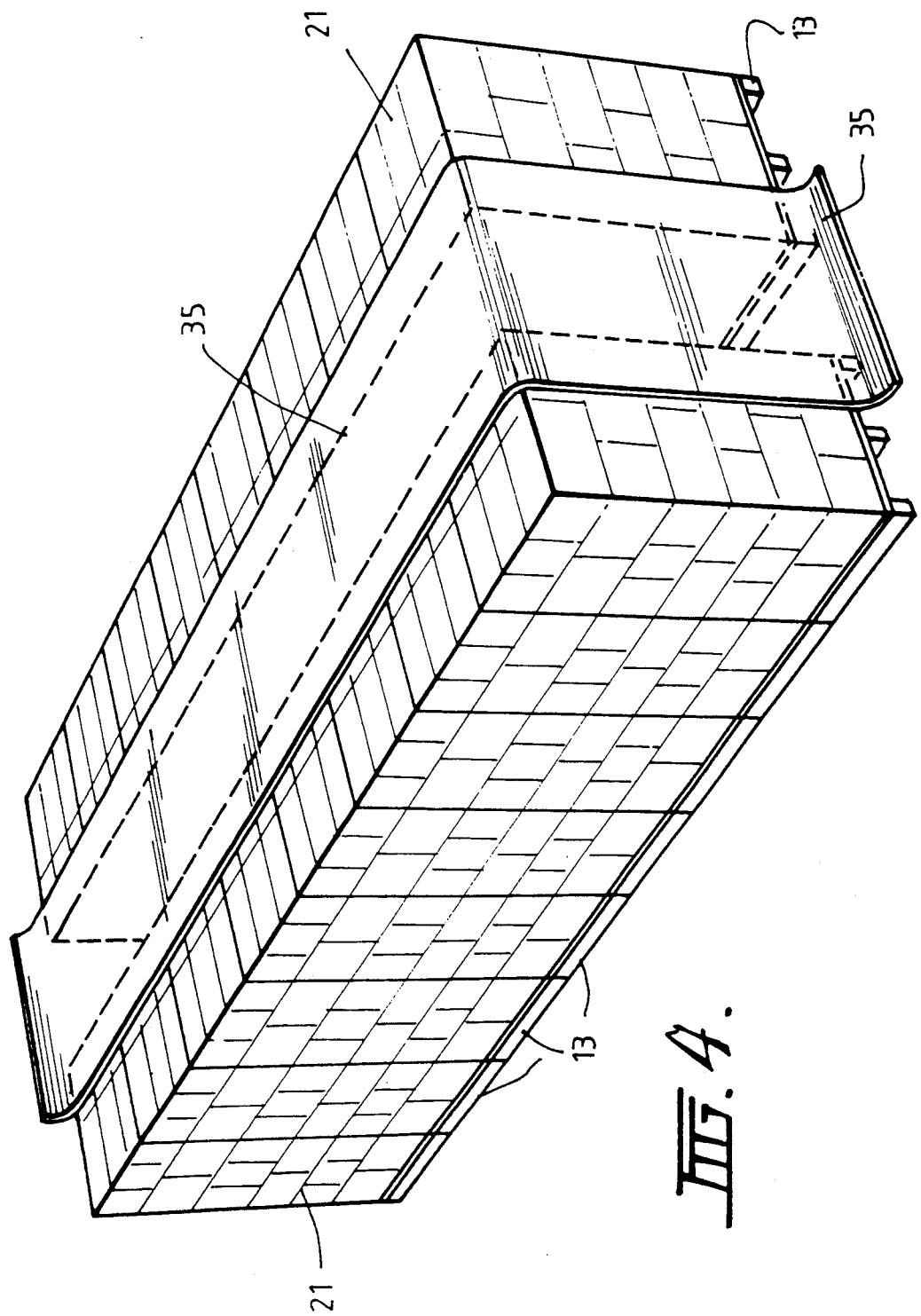
FIG. 4 is a perspective view of either a lower tier stack or an upper tier stack in two rows showing further sealing means over the intersitial volumes defined between the two rows.

Sealing means 33 (see FIG. 5 and FIG. 3) is provided between the lower intersitial volume 29 and the upper intersitial volume 31 at the bottom of the upper tier stack 23. the sealing means 33 can comprise a plate of steel or the like supported on the inner rails 20 and can provide a platform for supporting a person walking between the rows of the upper tier stacks 23. A ladder 26 is provided at the front end of the frame means 15 to permit access to the platform sealing means 33. The sealing means 33 has two upstanding elongate webs 34 which extend along each side thereof slightly inwardly of the extreme side edges and act to provide a seal at the pallets in the event the pallets are oriented so that the spaces between the lower rails of the pallets face the sealing means 33 (which is in a direction 90° to that shown in FIG. 4 and FIG. 5 where the spaces between the lower rails face the wall 3 and the doors 9 of the chamber 1). If such webs 34 were not provided, the atmosphere may tend to pass under the pallets in the upper stack 23 directly into the intersitial volume 31 without passing across the produce.

Further sealing means in the form of two blinds 35 are provided to lie over the top and down the outermost end of the upper tier stack 23, and the lower tier stack 21. Each blind 35 can be held on a roller and pulled out or retracted to cover the required upper or lower tier sacks respectively. Inlets 37 are provided in the end wall 3 to inlet atmosphere from between the upper intersitial volume 31 and the lower intersitial volume 29 into the controlled atmosphere producing apparatus 5. The inlets 37 have only been shown in FIGS. 5 and 2. Outlets 8 for atmosphere are provided in end wall 3 above the height of the upper tier stack 23.

In use, the controlled atmosphere air apparatus 5 and the fans 7 provide atmosphere control means which will permit controlled atmosphere to be provided into the chamber 1. The seal means 33 and the further seal means in the form of blinds 35 cause the controlled atmosphere to flow in the directions as shown by the arrows in FIG. 5—i.e. past fans 7, through the air handling apparatus 5, through outlets 8, through the atmosphere circulating spaces 27, through the crates in the palletized tiers 13 across the produce, into the upper and lower intersitial volumes 29 and 31 and through inlets 37 in the wall 3, to return to the air handling apparatus 5. Ducting 12 behind wall 3 causes the atmosphere to flow through the inlets 37 and to be returned to the air handling apparatus 5. Because the crates in which the bananas are stored have holes therein, the controlled atmosphere will pass through the crates and across the bananas and contact the bananas prior to passing into the upper or lower intersitial volumes 31 to 29.

If it is desired to remove crates of bananas from either the upper tier stack 23 or the lower tier stack 21, then they can be removed and the further sealing means in the form of the blinds 35 can be appropriately repositioned over the remaining crates and the apparatus will permit all of the bananas to be subjected to the controlled atmosphere flow.

In the prior U.S. Pat. No. 4,824,685 it is essential that the lower tier stack be to a predetermined height at all times in order that sealing can be effected between the vertical spacing between the upper and lower tier stacks. The present construction avoids the aforementioned problem.

In addition, with the construction proposed it is possible to only half fill each of the upper tier or lower tier stacks and still provide for effective flow of controlled atmosphere across the bananas.

The foam cushions (not shown) previously referred to are placed between the end wall 3 and the crates to effect a good atmospheric seal to ensure as far as possible that the bulk of the circulating atmosphere moves in the manner described. Similar foam cushions can be wedged between the end wall 3 and each of the rollers on which the blinds 35 are wound to seal any space therebetween. This will also assist in ensuring that the bulk of the circulating atmosphere moves in the manner described.

The chamber may be produced by known techniques used in the fabrication of ripening chambers for bananas.

Modifications may be made to the present invention as would be apparent to persons skilled in the arts relating to subjecting produce to controlled atmosphere. These and other modifications may be made without departing from the ambit of the invention, the nature of which is to be determined from the foregoing description.

We claim:
1. A chamber in which produce is to be subjected to a controlled atmosphere, frame means within said chamber for supporting an upper tier stack of produce in two rows above a lower tier stack of produce in two rows, said frame means locating each upper and lower tier stacks inwardly of the side walls of the chamber to define an atmosphere circulating space between the side walls and the upper and lower tier stacks, and with a respective upper intersitial volume between the upper rows, and a lower intersitial volume between the lower rows, sealing means for sealing the upper and lower intersitial volumes from each other near the lowermost level of the upper tier stack, further sealing means for sealing the upper intersitial volume and the lower intersitial volume from said atmosphere circulating space, and atmosphere control means to either exhaust or introduce controlled atmosphere from or into each of the upper and lower intersitial volumes, and to either introduce or exhaust controlled atmosphere respectively to said atmosphere circulation space, to thereby force the introduced controlled atmosphere to flow across said produce.

2. A chamber as claimed in claim 1 comprising an end wall in said chamber terminating directly with said upper and said lower intersitial volumes when said upper stacks and said lower stacks are loaded in said chamber abutting with said end wall, and an exhaust in said end wall at each of the upper intersitial volume and the lower intersitial volume.

3. A chamber as claimed in claim 2 wherein there is provided an inlet in said end wall for allowing controlled atmosphere to pass into said chamber to said atmosphere circulating space.

4. A chamber as claimed in claim 3 wherein the exhausts and the inlet terminate with a controlled atmosphere producing apparatus forming part of said chamber, said end wall being a false end wall of said chamber.

5. A chamber as claimed in claim 1 wherein said further sealing means comprises blind means for sealing the upper intersitial volume at the top of the upper tier stack and bliond means for sealing the lower intersitial volume at the top of the lower tier stack.

6. A chamber as claimed in claim 5 wherein the respective blind means lies on top of the respective upper or lower tier stacks to provide said sealing.

7. A chamber claimed in claim 1 wherein said chamber, said frame means and said upper and lower tier stacks are of a size that a fork-lift truck can enter the chamber to remove stacks of produce.

8. A chamber as claimed in claim 2 including door means at the end of said chamber remote from said end wall whereby said door means can be closed to close said chamber and opened to permit access for loading or unloading of stacks of produce in said chamber.

9. A method of subjecting produce to controlled atmosphere comprising the steps of:
(a) inserting produce into a chamber;
(b) arranging and supporting the produce in two rows of a lower tier stack on the floor of said chamber, and an upper tier stack on frame means above the lower tier stack, said two rows being spaced from one another to define an upper intersitial volume therebetween and a lower intersitial volume therebetween, and an atmosphere circulating space between the side walls of the chamber, (c) providing a seal between the upper intersitial volume and the lower intersitial volume near the bottom of the upper tier stack,
(d) sealing the upper intersitial volume and the lower intersitial volume from said atmosphere circulating space,
(e) exhausting or introducing controlled atmosphere from said upper and lower intersitial volumes and introducing or exhausting controlled atmosphere into said fluid circulation space to thereby force controlled atmosphere to flow across said produce.

10. A method as claimed in claim 9 wherein said sealing at step (d) is effected by blind means which is drawn over the top of the upper tier stacks and by blind means which is drawn over the top of the lower tier stacks, each blind means resting on the top of the respective tier stacks to effect such sealing.

* * * * *